US010447126B2

(12) United States Patent
Matsushita et al.

(10) Patent No.: US 10,447,126 B2
(45) Date of Patent: Oct. 15, 2019

(54) INDUCTION MOTOR INCLUDING ROTOR TEETH HAVING AN INCLINED SURFACE

(71) Applicant: Kabushiki Kaisha Toshiba, Minato-ku (JP)

(72) Inventors: Makoto Matsushita, Fuchu (JP); Daisuke Misu, Tama (JP); Norio Takahashi, Yokohama (JP); Katsutoku Takeuchi, Kawasaki (JP); Fumiaki Ito, Fuchu (JP); Toshio Hasebe, Hachioji (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 235 days.

(21) Appl. No.: 15/585,712

(22) Filed: May 3, 2017

(65) Prior Publication Data

US 2017/0237322 A1     Aug. 17, 2017

Related U.S. Application Data

(63) Continuation of application No. PCT/JP2015/081902, filed on Nov. 12, 2015.

(30) Foreign Application Priority Data

Nov. 21, 2014   (JP) ................................ 2014-237153

(51) Int. Cl.
*H02K 1/16*     (2006.01)
*H02K 1/26*     (2006.01)
(Continued)

(52) U.S. Cl.
CPC .............. *H02K 17/16* (2013.01); *H02K 1/16* (2013.01); *H02K 1/26* (2013.01); *H02K 17/165* (2013.01);
(Continued)

(58) Field of Classification Search
CPC ........ H02K 17/16; H02K 17/165; H02K 1/26; H02K 1/16; H02K 1/24; H02K 2213/03; H02K 2201/03
(Continued)

(56) References Cited

U.S. PATENT DOCUMENTS 2,139,748 A * 12/1938 Harrell ............... B22D 19/0054
                                                          164/DIG. 10
3,778,652 A * 12/1973 Endress ............... H02K 17/165
                                                          310/211
(Continued)

FOREIGN PATENT DOCUMENTS

FR     2 784 815 A1    4/2000
JP     5-83908         4/1993
(Continued)

OTHER PUBLICATIONS

Extended Search Report dated Jun. 11, 2018 in European Patent Application No. 15861795.1.
(Continued)

*Primary Examiner* — John K Kim
(74) *Attorney, Agent, or Firm* — Oblon, McClelland, Maier & Neustadt, L.L.P.

(57) ABSTRACT

According to one embodiment, an induction motor includes a stator and a rotor. The stator has a stator coil disposed at a stator core having a plurality of stator slots. The rotor has a rotor core rotatably provided with respect to the stator. The rotor core includes a plurality of rotor teeth and a rotor slot formed between the plurality of rotor teeth and having a rotor conductor disposed therein. The rotor teeth include a teeth main body and a flange. The teeth main body extends in a radial direction of the rotor core. The flange extends in a rotating direction of the rotor core from a distal end of the teeth main body. Then, a recessed surface is formed on at least part of an outer circumferential surface of a radial outer side in the flange.

2 Claims, 8 Drawing Sheets

(51) Int. Cl.
*H02K 1/24* (2006.01)
*H02K 17/16* (2006.01)

(52) U.S. Cl.
CPC ........... *H02K 1/24* (2013.01); *H02K 2201/03* (2013.01); *H02K 2213/03* (2013.01)

(58) Field of Classification Search
USPC .......................................... 310/211, 216.093
See application file for complete search history.

(56) References Cited

U.S. PATENT DOCUMENTS

| | | | | |
|---|---|---|---|---|
| 4,469,970 | A | * | 9/1984 | Neumann ............ H02K 1/2773 310/156.78 |
| 6,175,177 | B1 | | 1/2001 | Sabinski et al. |
| 2011/0140565 | A1 | * | 6/2011 | Yabe .................... H02K 17/185 310/211 |
| 2017/0237322 | A1 | * | 8/2017 | Matsushita ............ H02K 17/16 310/166 |

FOREIGN PATENT DOCUMENTS

| | | |
|---|---|---|
| JP | 7-288958 | 10/1995 |
| JP | 9-289761 | 11/1997 |
| JP | 2011-87375 | 4/2011 |
| JP | 2014-195374 | 10/2014 |
| WO | WO 2012/107109 A1 | 8/2012 |

OTHER PUBLICATIONS

International Search Report dated Dec. 8, 2015 in PCT/JP2015/081902 filed on Nov. 12, 2015 (with English translation).
Written Opinion dated Dec. 8, 2015 in PCT/JP2015/081902 filed on Nov. 12, 2015.

* cited by examiner

INDUCTION MOTOR INCLUDING ROTOR TEETH HAVING AN INCLINED SURFACE

CROSS-REFERENCE TO RELATED APPLICATION

This is a Continuation Application of International Application No. PCT/JP2015/081902, filed on Nov. 12, 2015, which claims priority to Japanese Patent Application No. 2014-237153, filed on Nov. 21, 2014, and the entire contents of all of the aforementioned applications are incorporated herein by reference.

FIELD

Embodiments described herein relate generally to an induction motor.

BACKGROUND

As an induction motor, a so-called squirrel-cage induction motor using a squirrel-cage rotor is known. This squirrel-cage induction motor is constituted by a stator in which a stator coil is disposed in a substantially cylindrical stator core having a plurality of stator slots and a rotor that is provided close to a radial inner side than the stator and is provided to be rotatable with respect to the stator.

The rotor includes a rotating shaft and a rotor core which is externally fitted onto and fixed to the rotating shaft. In the rotor core, a plurality of rotor teeth extending in a radial direction are radially disposed, and a rotor slot is formed between rotor teeth adjacent in a circumferential direction. A rotor bar (a conductor bar) is disposed in this rotor slot. An end ring (an end ring for short-circuiting) formed in an annular shape for surrounding the rotating shaft is provided at both ends in an axial direction of the rotor bar. The rotor bar and end ring constitute a secondary conductor.

Then, the rotor rotates by interaction between a magnetic field generated on the stator side and an induced current generated at the secondary conductor due to the magnetic field.

In recent years, efficiency regulation for induction motors (top-runner regulation) has been promoted. In addition, efficiency improvement has been promoted in terms of energy saving, low noise, further miniaturization, or the like even in induction motors used as main motors of railway cars, for example.

Here, when the miniaturization and high torque in induction motors are intended to be accomplished, it is necessary to increase a magnetic flux density in a gap formed between the stator core and the rotor core. However, spatial harmonic component is also largely increased, and consequently harmonic secondary copper loss (copper loss on the rotor side) also becomes large, and thereby there is possibility of degradation of motor characteristics.

DETAILED DESCRIPTION

According to one embodiment, an induction motor includes a stator and a rotor. The stator has a stator coil disposed at a stator core having a plurality of stator slots. The rotor has a rotor core rotatably provided with respect to the stator. The rotor core includes a plurality of rotor teeth and a rotor slot formed between the plurality of rotor teeth and having a rotor conductor disposed therein. The rotor teeth include a teeth main body and a flange. The teeth main body extends in a radial direction of the rotor core. The flange extends in a rotating direction of the rotor core from a distal end of the teeth main body. Then, a recessed surface is formed on at least part of an outer circumferential surface of a radial outer side in the flange. The recessed surface is spaced further from the stator core than from an end surface of the radial outer side of the teeth main body in a direction toward a distal end of the rotating direction. Also, the flange is tapered in the rotating direction toward the distal end.

Hereinafter, an induction motor according to embodiments will be described with reference to the drawings.

First Embodiment

First, a first embodiment will be described with reference to FIGS. 1 to 4.

Figure 1:
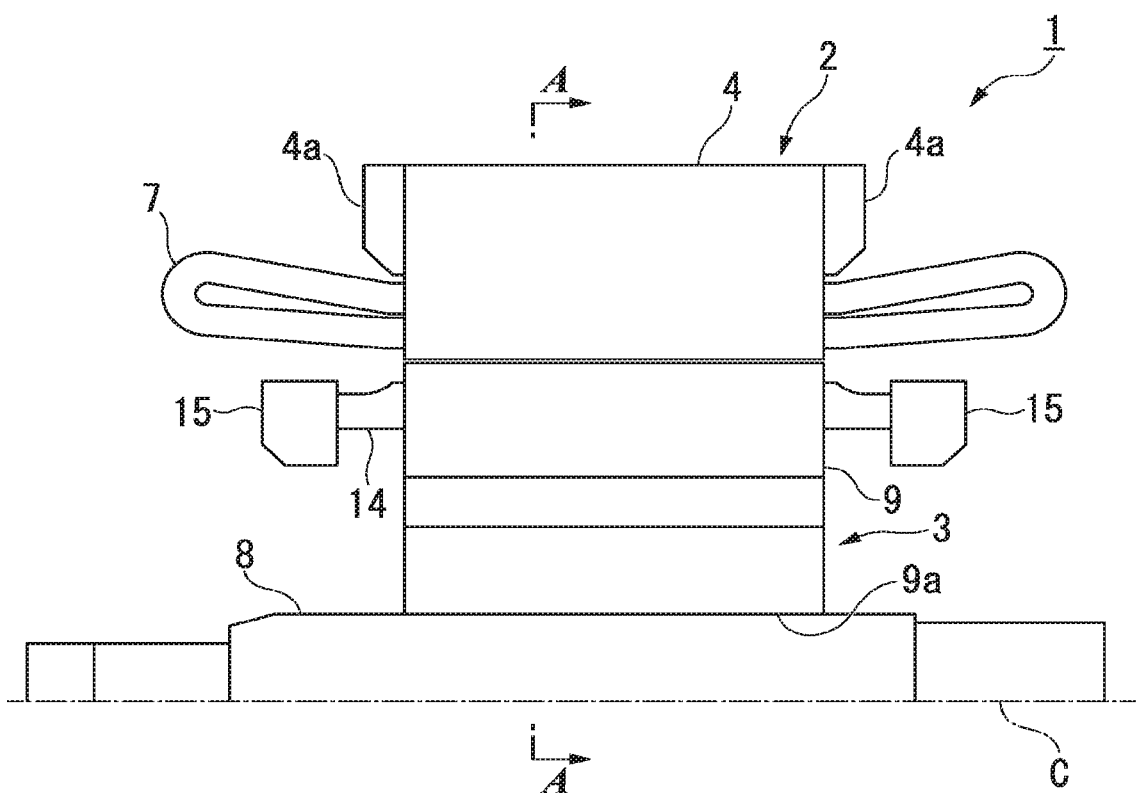
FIG. 1 is a schematic configuration view showing an induction motor of a first embodiment.
Figure 2:
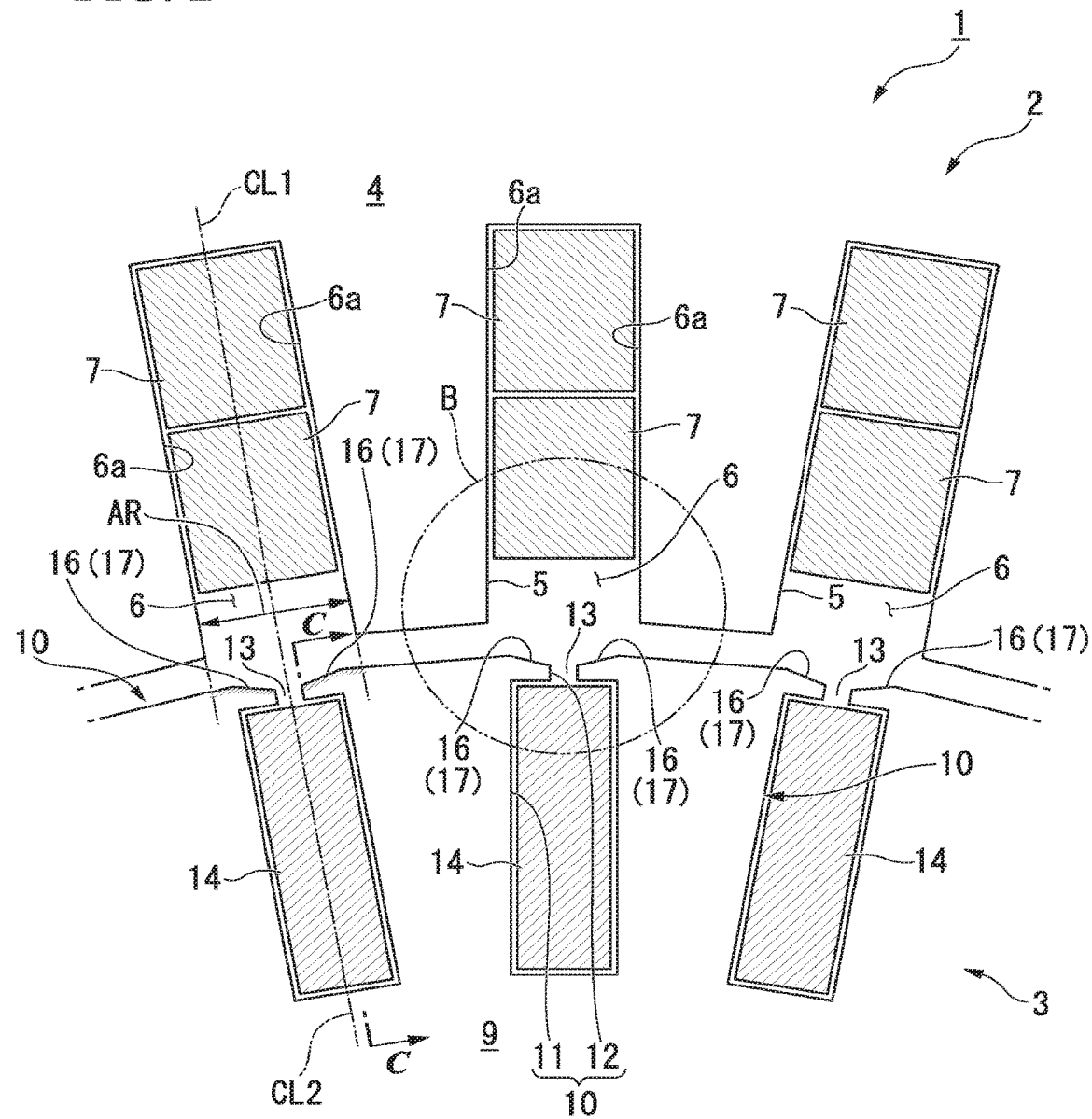
FIG. 2 is a cross-sectional view taken along line A-A shown in FIG. 1.

FIG. 1 is a schematic configuration view showing an induction motor 1. FIG. 2 is a cross-sectional view taken along line A-A shown in FIG. 1.

As shown in FIGS. 1 and 2, the induction motor 1 includes: a substantially cylindrical stator 2; and a rotor 3 disposed closer to a radial inner side than the stator 2 and rotatably provided with respect to the stator 2.

Also, in the following drawings, a scale of each member will be appropriately changed so that the description can be more easily understood. In addition, in the following description, an axial direction of the rotor 2 will be referred to simply as an axial direction, a rotating direction of the rotor 2 will be referred to as a circumferential direction, and a radial direction of the rotor 2 will be referred to simply as a radial direction.

The stator 2 has a substantially cylindrical stator core 4. The stator core 4 is a structure of a plurality of electromagnetic steel sheets stacked in the axial direction, for example. Both ends of the stator core 4 in the axial direction are held by stator core pressers 4a. Also, the electromagnetic steel sheets are thin steel sheets manufactured by adding silicon to iron.

A plurality of stator teeth 5 protruding toward a radial center of the stator core 4 are formed on an inner circumferential surface side of the stator core 4. These stator teeth 5 are disposed at regular intervals in the circumferential direction. Also, a stator slot 6 is individually formed between the stator teeth 5 adjacent in the circumferential direction. Then, a stator coil 7 is disposed in each stator slot 6.

The rotor 3 includes a rotating shaft 8 disposed at the radial center of the stator core 4 and rotatably supported by a shaft bearing (not shown). At a position of the rotating shaft 8 corresponding to the stator core 4, a substantially columnar rotor core 9 is externally fitted and fixed. The rotor core 9 is a structure of a plurality of electromagnetic steel sheets stacked in the axial direction, for example. A through hole 9a into which the rotating shaft 8 can be inserted or press-fitted is formed at a radial inner side of the rotor core 9. The rotating shaft 8 is inserted into the through hole 9a.

Also, a plurality of rotor teeth 10 protruding toward a radial outer side are formed on an outer circumferential surface side of the rotor core 9. These rotor teeth 10 are radially disposed at regular intervals in the circumferential direction. In addition, the rotor teeth 10 are formed to have a substantially T-shaped cross section. The rotor teeth 10 are constituted by a teeth main body 11 which extends in the radial direction and a flange 12 which extends in the circumferential direction from a distal end of the teeth main body 11.

Figure 3:
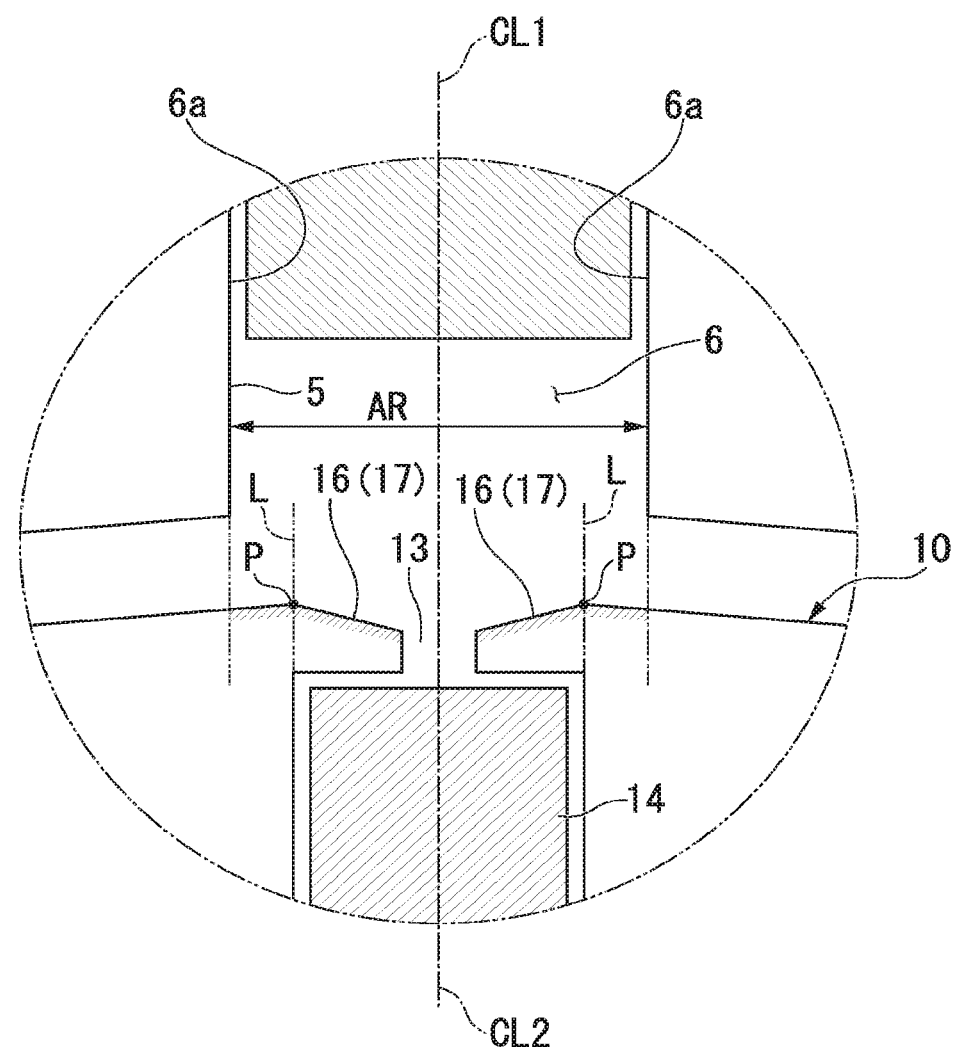
FIG. 3 is an enlarged view showing a portion B shown in FIG. 2.

FIG. 3 is an enlarged view showing a portion B shown in FIG. 2.

As shown in this drawing, a recess 16 is provided on the outer circumferential surface of the radial outer side of the flange 12. The recess 16 is provided over the entire axial direction of the rotor teeth 10. Since the recess 16 is provided, when a point at which an outer circumferential surface of the flange 12 intersects with an extending line L of a side surface of the teeth main body 11 is defined as a reference point P, the flange 12 is formed to be gradually tapered in the circumferential direction toward a distal end.

Here, the recess 16 is a inclined surface 17 formed on the outer circumferential surface of the flange 12 and formed to gradually be spaced further from the stator core 9 than from an end surface of the radial outer side of the teeth main body 11 in a direction from the reference point P in the circumferential direction toward the distal end of the flange 12. Also, a function of the recess 16 will be described later.

As shown in FIG. 1, a rotor slot 13 is formed between the rotor teeth 10 formed as described above. A rotor bar 14 whose cross section is substantially rectangular is disposed at a position surrounded by the teeth main body 11 of the rotor slot 13 and the flange 12. The rotor bar 14 is an electric conductor such as copper or aluminum and constituted of a nonmagnetic material.

Also, an annular end ring 15 is provided at both ends of the rotor bar 14 in the axial direction. The end ring 15 also is constituted of the same material as the rotor bar 14.

Next, the function of the recess 16 formed on the rotor teeth 10 will be described.

First, an operation of the induction motor 1 will be described.

In order to operate the induction motor 1, power is supplied to the stator coil 7. When power is supplied to the stator coil 7, magnetic flux is formed in the stator core 4. The magnetic flux passes through the rotor teeth via the stator teeth 5. Then, an induced current is generated in the rotor bar 14 and the end ring 15, and the rotor 3 rotates by interaction between the induced current and the magnetic flux formed in the stator core 4.

Here, the magnetic flux passes through the rotor teeth 10, but hardly passes through the rotor slot 13 formed between the rotor teeth 10 adjacent in the circumferential direction. That is, when viewed from the outer circumferential surface of the rotor core 9, a change in magnetic flux density is great between a portion in which the rotor teeth 10 are formed and a portion in which the rotor slot 13 is formed. When the rotor 3 rotates in this state, a fluctuation in magnetic flux occurs according to a rotation angle of the rotor 3, which becomes a spatial harmonic, thereby resulting in a great increase in harmonic secondary copper loss (copper loss of the rotor bar 14). This is because the rotor bar 14 is disposed on the outer circumferential surface side of the rotor core 9 to reduce leakage inductance thereof; however, in this case, influence of the spatial harmonic is greatly increased on the radial outer side of the rotor bar 14, causing the harmonic secondary copper loss to increase.

Here, the recess 16 is formed on the flange 12 of the rotor teeth 10. Therefore, a gap between the flange 12 and the stator 2 becomes gradually larger in the circumferential direction toward the distal end of the flange 12. In other words, since the flange 12 is formed to be tapered in the direction toward the distal end, it becomes difficult for the magnetic flux to pass through the flange 12.

Thus, the change in magnetic flux density between the rotor teeth 10 and the rotor slot 13 is not a drastic change but a smooth change. Also, influence of the spatial harmonic on the radial outer side of the rotor bar 14 facing the distal end in the radial direction is reduced according to the extent to which it is difficult for the magnetic flux to pass through the distal end side of the flange 12 in the circumferential direction.

Furthermore, due to the recess 16 provided on the flange 12, leakage magnetic flux at the distal end side of the flange 12 is reduced and the leakage inductance is not increased or reduced so much when compared to the case in which the recess 16 is not provided.

Here, a correlation between a shape of the recess 16 and the harmonic secondary copper loss (copper loss of the rotor bar 14 (rotor copper loss)) will be described in detail with reference to FIG. 4.

Figure 4:
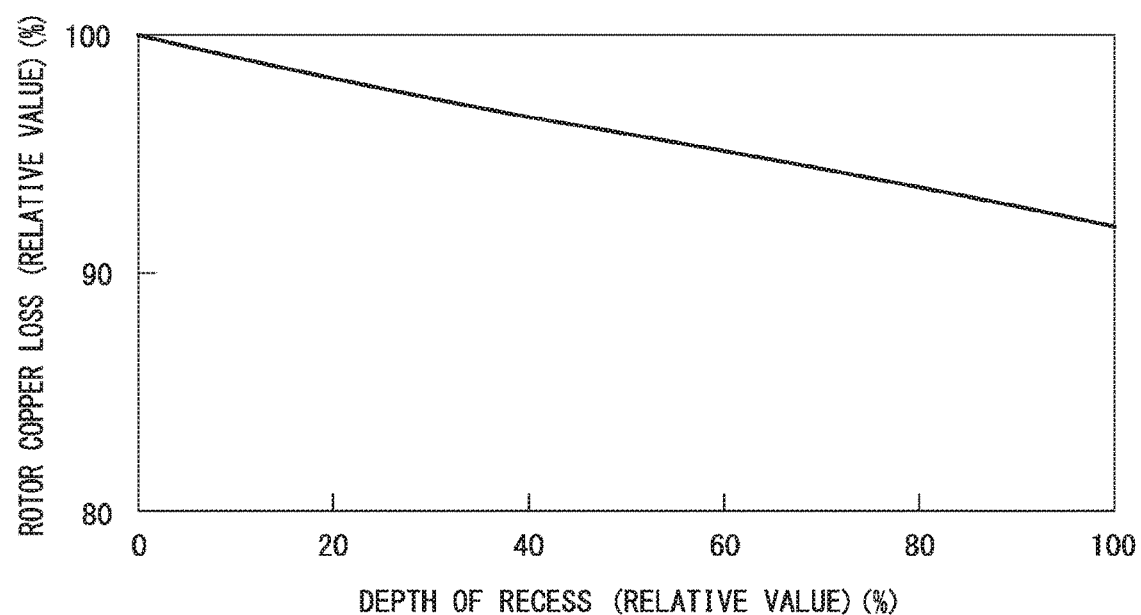
FIG. 4 is a graph showing a change in relative value of rotor copper loss of the first embodiment.

FIG. 4 is a graph showing a change in relative value of the rotor copper loss when the vertical axis is a relative value (%) of the rotor copper loss and the horizontal axis is a relative value (%) of a depth of the recess 16. In addition, in FIG. 4, the relative value of the rotor copper loss is defined as 100% when the recess 16 is not provided. Also, the relative value of the depth of the recess 16 is defined as 0% when the recess 16 is not provided. That is, when the relative value of the depth of the recess 16 is 100%, the recess 16 is formed in the same thickness as the flange 12 in the radial direction.

As shown in FIG. 4, it is confirmed that the relative value of the rotor copper loss becomes smaller as the relative value of the depth of the recess 16 grows larger.

Therefore, according to the first embodiment described above, by providing the recess 16 on the distal end side in the circumferential direction of the flange 12, the harmonic secondary copper loss due to the influence of the spatial harmonic on the rotor bar 14 can be reduced without disposing the rotor bar 14 closer to the radial inner side of the rotor core 9. Therefore, it is possible to provide a small and highly efficient induction motor 1.

Second Embodiment

Next, a second embodiment will be described with reference to FIGS. 3, 5, and 6.

Figure 5:
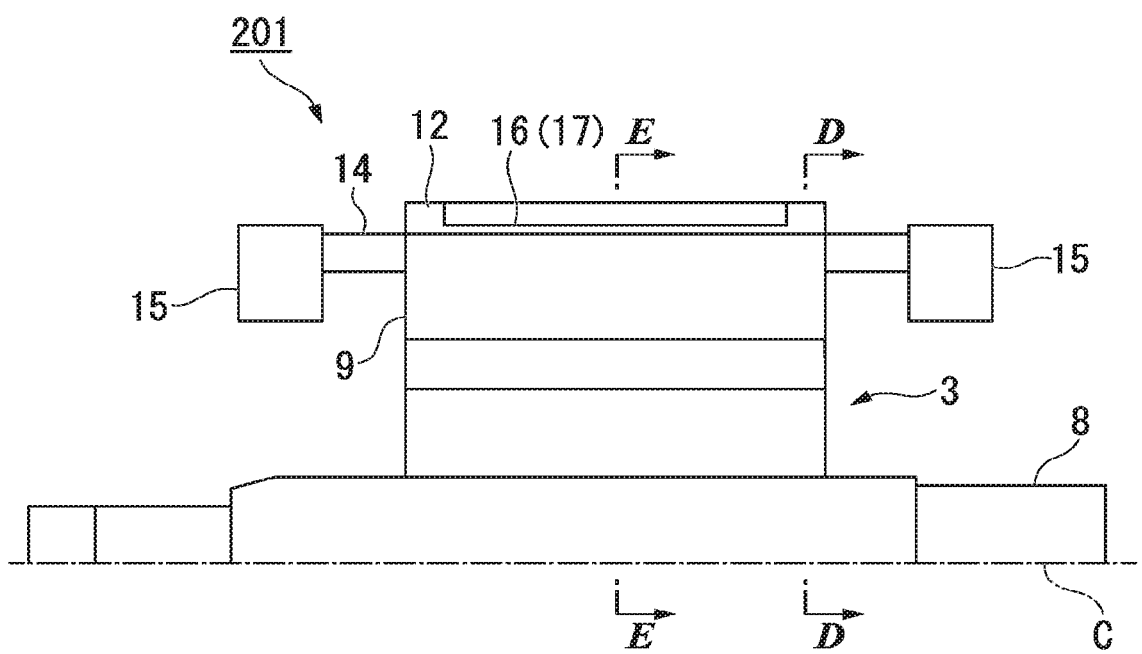
FIG. 5 is a schematic configuration view showing an induction motor of a second embodiment.

FIG. 5 is a schematic configuration view showing an induction motor 201 in the second embodiment and corresponds to a cross-sectional view taken along line C-C shown in FIG. 2 described above. FIG. 6 is a cross-sectional view taken along line D-D shown in FIG. 5. Also, in the following description, the same aspects as in the first embodiment are assigned the same reference numerals and a description thereof will be omitted (this is the same in subsequent embodiments).

Figure 6:
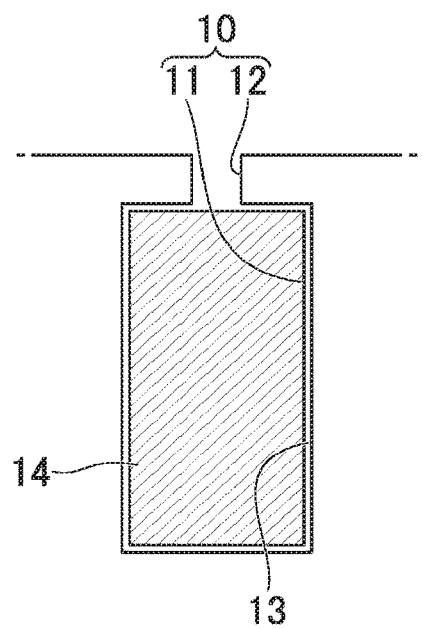
FIG. 6 is a cross-sectional view taken along line D-D shown in FIG. 5.

As shown in FIGS. 5 and 6, in this second embodiment, a recess 16 (an inclined surface 17) formed on a flange 12 of rotor teeth 10 is not formed on the entire flange 12 in the axial direction but is formed at a position avoiding both ends of the rotor teeth 10 in the axial direction. This point is different from the above-described first embodiment. Also, a cross-sectional shape of the position avoiding both ends of the rotor teeth 10 in the axial direction (a cross-sectional shape taken along line E-E in FIG. 5) is the same as in FIG. 3 in the first embodiment described above.

Here, as in the first embodiment described above, when the recess 16 is provided on the flange 12 of the rotor teeth 10, while harmonic secondary copper loss can be reduced, the rigidity of a rotor core 9 is weakened according to the extent to which the recess 16 is provided, thereby resulting in weakened holding strength for a rotor bar 14 in this rotor core 9.

In contrast, as in the present second embodiment, the rigidity in both ends of the flange 12 in the axial direction can be increased by forming the recess 16 at the position avoiding both ends in the axial direction on the flange 12 of the rotor teeth 10.

Also, since the magnetic flux leakage is generated at both ends of the rotor core 9 in the axial direction, the harmonic secondary copper loss at both ends of the rotor core 9 in the axial direction tends to be small compared to the harmonic secondary copper loss at the center of the rotor core 9 in the axial direction. Therefore, even when the recess 16 is not formed at both ends of the rotor core 9 in the axial direction, it is possible to sufficiently reduce the harmonic secondary copper loss of a rotor 3 as a whole.

Therefore, according to the second embodiment described above, the harmonic secondary copper loss can be reduced while securing the rigidity of the rotor core 9.

Also, in the flange 12, an axial direction width of a portion in which the recess 16 is not formed can be arbitrarily set. The following can be considered as a method for setting the axial direction width of the portion in which the recess 16 is not formed, for example.

That is, the harmonic secondary copper loss can be further reduced as a range in which the recess 16 is formed grows wider while the rigidity of the rotor core 9 can be further increased as a range in which the recess 16 is not formed becomes smaller. Thus, the axial direction width of the portion in which the recess 16 is not formed is set in consideration of a balance between the relative value (%) of the harmonic secondary copper loss to be reduced and the rigidity of the rotor core 9 to be secured.

Third Embodiment

Next, a third embodiment will be described with reference to FIGS. 7 and 8.

Figure 7:
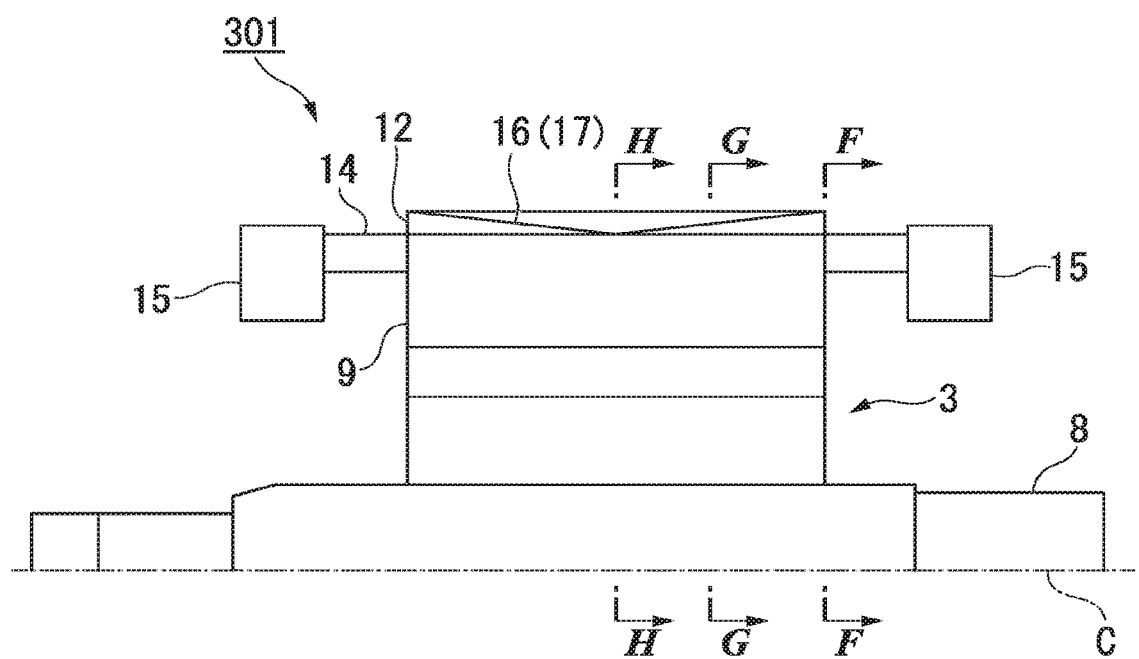
FIG. 7 is a schematic configuration view showing an induction motor of a third embodiment.

FIG. 7 is a schematic configuration view showing an induction motor 301 in the third embodiment and corresponds to a cross-sectional view taken along line C-C shown in FIG. 2 described above. FIG. 8 is a cross-sectional view taken along line H-H shown in FIG. 7.

Figure 8:
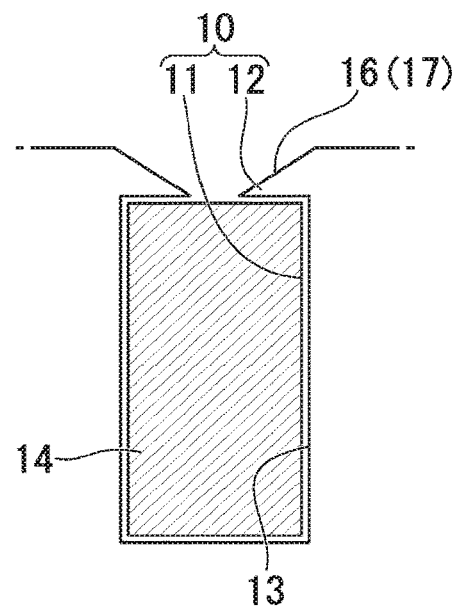
FIG. 8 is a cross-sectional view taken along line H-H shown in FIG. 8.

As shown in FIGS. 7 and 8, in this third embodiment, an inclination gradient of a recess 16 (an inclined surface 17) formed on a flange 12 of rotor teeth 10 is set to gradually become steeper in the direction toward the center in an axial direction. This point is different from the first embodiment described above.

Also, a cross-sectional shape of both ends of the rotor teeth 10 in the axial direction (a cross-sectional shape taken along line F-F in FIG. 7) is the same as in FIG. 6 in the second embodiment described above. In addition, between a cross-sectional shape at both ends and al the center of the rotor teeth 10 in the axial direction, or rather, a cross-sectional shape of the center in the axial direction (a cross-sectional shape taken along line G-G in FIG. 7), is the same as in FIG. 3 of the first embodiment described above.

Here, as described in the second embodiment above, harmonic secondary copper loss grows larger in the direction toward the center of a rotor core 9 in the axial direction. Therefore, it is possible to efficiently reduce the harmonic secondary copper loss by changing an inclination gradient of the recess 16 (the inclined surface 17) to cope with a degree of the harmonic secondary copper loss. Also, since the flange 12 is constructed to cut off as little as possible, the rigidity of the rotor core 9 can be secured and degradation in the holding force of a rotor bar 14 by the rotor core 9 can be limited.

Fourth Embodiment

Next, a fourth embodiment will be described with reference to FIG. 9.

Figure 9:
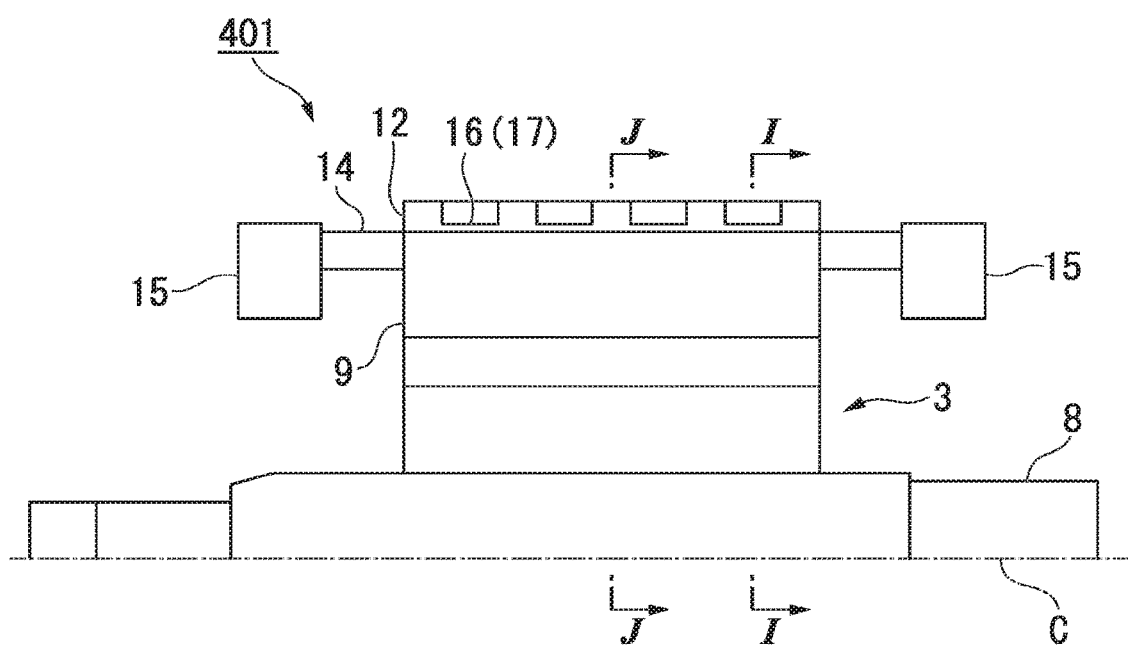
FIG. 9 is a schematic configuration view showing an induction motor of a fourth embodiment.

FIG. 9 is a schematic configuration view showing an induction motor 401 in the fourth embodiment and corresponds to a cross-sectional view taken along line C-C shown in FIG. 2 described above.

As shown in FIG. 9, in this fourth embodiment, recesses 16 formed on a flange 12 of rotor teeth 10 are disposed at intervals in an axial direction. This point is different from the first embodiment described above.

Also, a cross-sectional shape of a portion in which the recesses 16 are formed on the flange 12 of the rotor teeth 10 (a cross-sectional shape taken along line I-I in FIG. 9) is the same as in FIG. 6 in the second embodiment described above. Also, a cross-sectional shape of a portion in which the recesses 16 are not formed on the flange 12 of the rotor teeth 10 (a cross-sectional shape taken along line J-J in FIG. 9) is the same as in FIG. 3 in the first embodiment described above.

An axial direction width of the recesses 16 formed on the flange 12 is set to a predetermined width. Then, a plurality of recesses 16 (four in this embodiment, for example) are disposed at regular intervals in the axial direction. In other words, in the flange 12, the portions in which the recesses 16 are formed and the portions in which the recesses 16 are not formed are alternately disposed in the axial direction.

Here, when the recesses 16 are formed on the flange 12, while harmonic secondary copper loss can be reduced, equivalent magnetic resistance of a gap increases, thereby resulting in decrease in rotational torque of the induction motor 401. Thus, it is possible to secure the rotational torque of the induction motor 401 while reducing the harmonic secondary copper loss by alternately disposing the portions in which the recesses 16 are formed and the portions in which the recesses 16 are not formed on the flange 12.

Also, in the fourth embodiment described above, the case in which the recesses 16 whose axial direction width is set to a predetermined width are disposed at regular intervals is the axial direction is described. However, the embodiment is not limited thereto, and the axial direction width of each of the recesses 16 may not be set to be the same. In addition, the recesses 16 may not all be disposed at regular intervals.

Fifth Embodiment

Figure 10:
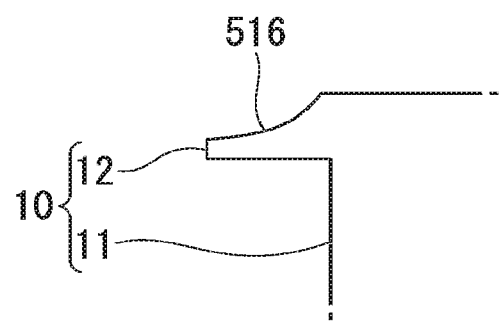
FIG. 10 is an enlarged plan view showing a flange of a fifth embodiment.

FIG. 10 is an enlarged plan view showing a flange 12 in a fifth embodiment.

As shown in this drawing, a different point between the first embodiment described above and the fifth embodiment is that the shape of the recess 16 in the first embodiment and a shape of a recess 516 in the fifth embodiment are different from each other.

More specifically, the recess 516 in the fifth embodiment is formed on an outer circumferential surface of the flange 12 and is formed to be curved in a concave shape and to gradually be spaced further from a stator core 9 than from an end surface of a radial outer side of a teeth main body 11 in a direction toward a distal end of the flange 12 in a circumferential direction. Even in the case of such a formation, the same effect as that of the first embodiment can be achieved.

Also, the recess 516 may be formed to be curved in a projected shape opposite to the recessed shape. In other words, the recess 516 may be formed to be curved to be swollen toward the outer circumferential surface side of the flange 12.

Also, in the above-description from the first embodiment to the fourth embodiment, when a point at which the outer circumferential surface of the flange 12 intersects with an extending line L of the side surface of the teeth main body 11 is defined as the reference point P, the case in which the recesses 16 and 516 are formed to be gradually tapered in the direction toward the distal end thereof in the circumferential direction is described. However, the embodiment is not limited thereto. That is, as shown in FIGS. 2 and 3, the recesses 16 and 516 may be provided in AR which forms the stator slot 6 and is between two side surfaces 6a facing the circumferential direction in a state in which a straight line CL1 passing through a width-direction center of the stator slot 6 and an axial center C of the rotating shaft 8 (a rotation axis of the rotor 3; see FIG. 1) and a straight line CL2 passing through a width-direction center of the rotor slot 13 and the axial center C of the rotating shaft 8 are positioned on the same straight line. That is, the recesses 16 and 516 may be provided in slanted line portions in FIGS. 2 and 3.

With the above-described configuration, the harmonic secondary copper loss due to the influence of the spatial harmonic can be reduced while degradation in performance of the motor torque is limited by securing the magnetic flux passing through the rotor teeth 10 as much as possible.

Also, in the above-described embodiments, the induction motors 1, 201, 301, and 401 can be used for various applications.

According to at least one of the above-described embodiments, the harmonic secondary copper loss due to the influence of the spatial harmonic on the rotor bar 14 can be reduced without disposing the rotor bar 14 closer to the radial inner side of the rotor core 9 by providing the recesses 16 and 516 or the through hole 18 on the distal end side of the flange 12 in the circumferential direction. Therefore, it is possible to provide a small and highly efficient induction motor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An induction motor comprising:
a stator in which a stator coil is disposed in a stator core having a plurality of stator slots; and
a rotor having a rotor core rotatably provided with respect to the stator,
wherein the stator core includes a plurality of stator teeth that protrude toward a radial center of the stator core and are formed on an inner circumferential surface side of the stator core, wherein the stator slots are formed between the stator teeth adjacent in a circumferential direction,
wherein the rotor core includes:
a plurality of rotor teeth; and
a rotor slot formed between the plurality of rotor teeth and having a rotor conductor disposed therein,
wherein the rotor teeth include:
a teeth main body extending in a radial direction of the rotor core; and
a flange extending in a rotating direction of the rotor core from a distal end of the teeth main body,
wherein an inclined surface is formed on at least part of an outer circumferential surface of a radial outer side in the flange,
wherein the inclined surface is spaced further from the stator core than from an end surface of a radial outer side of the teeth main body in a direction toward a distal end of the rotating direction,
wherein the flange is tapered in the rotating direction toward a distal end so that a gap between the flange and the stator becomes gradually larger in the rotating direction toward the distal end of the flange,
wherein the inclined surface is formed at a position avoiding both ends in the axial direction of the rotor teeth, and
wherein a portion in which the inclined surface is formed and a portion in which the inclined surface is not formed are alternately disposed on the rotor teeth in the axial direction of the rotor core.

2. The induction motor according to claim 1, wherein the inclined surface is formed between the stator teeth facing the rotating direction in a state in which a straight line passing through a width-direction center in the rotating direction of the stator slot and a rotation axis of the rotor and a straight line passing through a width-direction center in the rotating direction of the rotor slot and the rotation axis of the rotor are positioned on the same straight line.

* * * * *